Nov. 18, 1941.                C. C. FULTON                2,263,082
                       POWER OPERATED SICKLE MOWER
                          Filed May 6, 1940              2 Sheets-Sheet 1
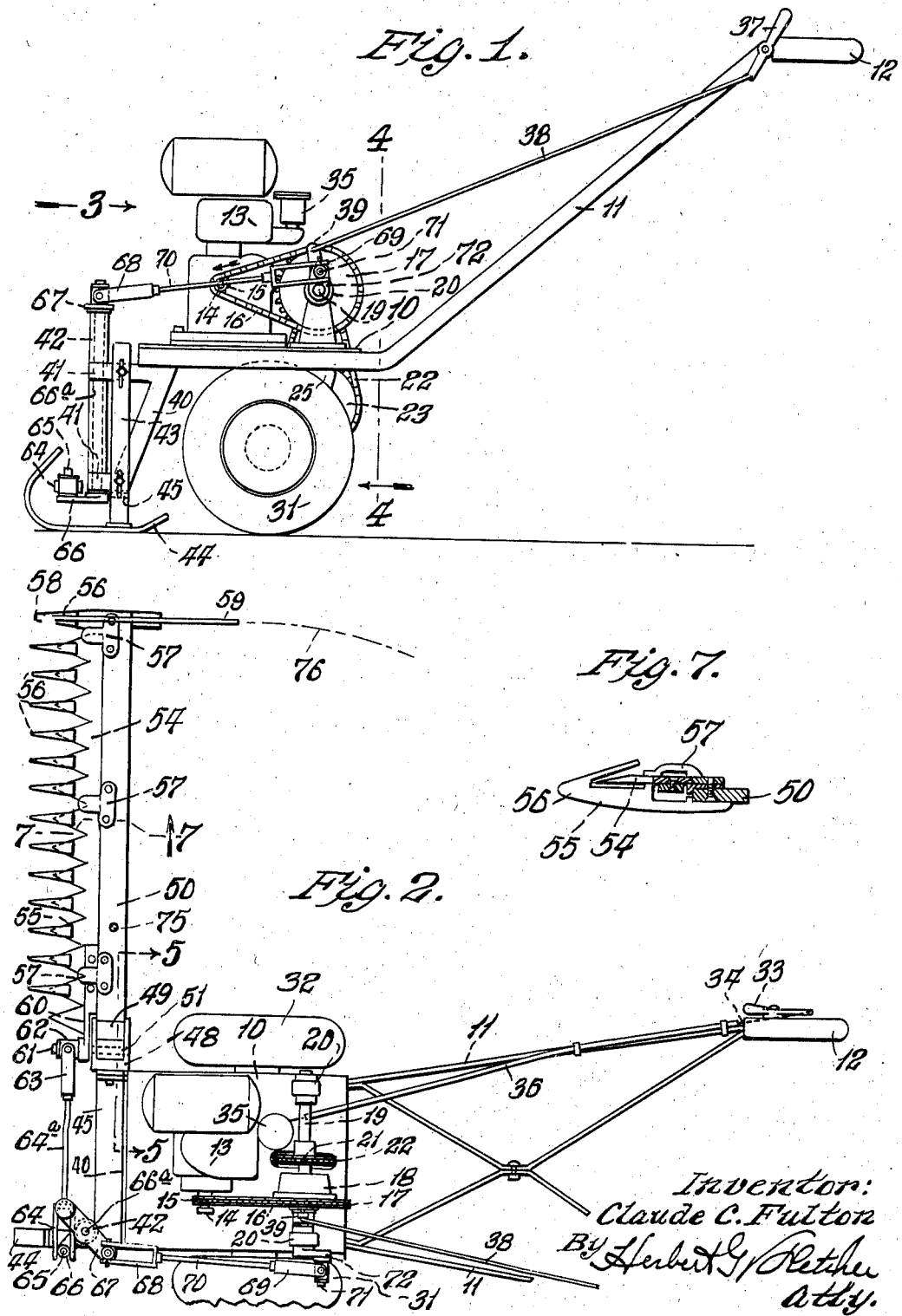
Inventor:
Claude C. Fulton
By Herbert G. Fletcher
           atty.

Nov. 18, 1941.  C. C. FULTON  2,263,082
POWER OPERATED SICKLE MOWER
Filed May 6, 1940  2 Sheets-Sheet 2
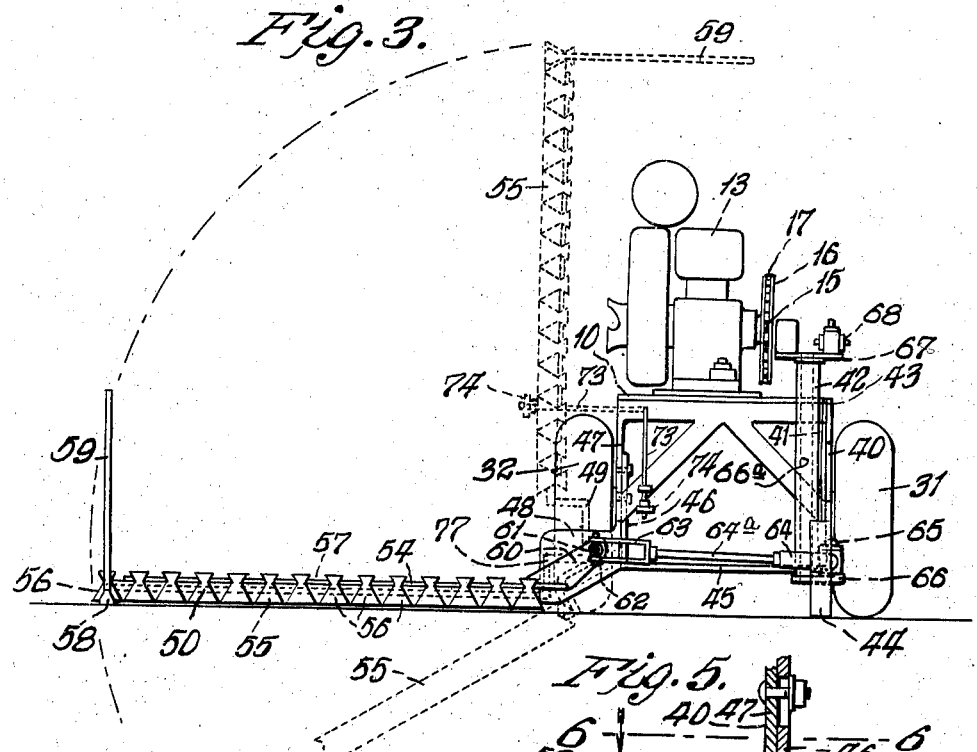
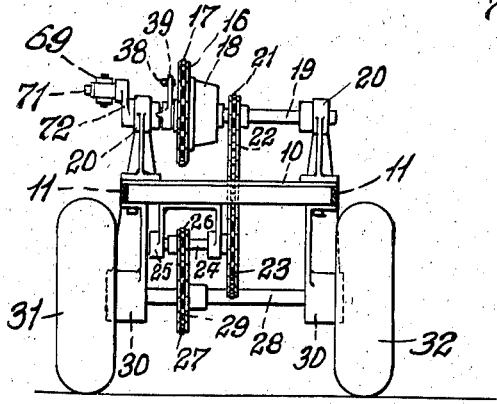
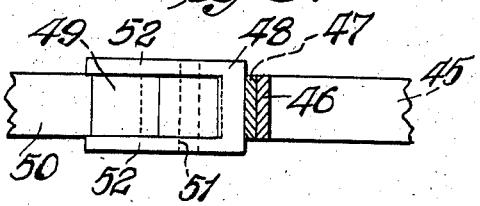
Inventor:
Claude C. Fulton
By Herbert G. Fletcher
Atty.

Patented Nov. 18, 1941

2,263,082

UNITED STATES PATENT OFFICE 2,263,082

POWER OPERATED SICKLE MOWER

Claude C. Fulton, St. Louis, Mo., assignor to Fulton Mower and Manufacturing Co., St. Louis, Mo., a corporation of Missouri Application May 6, 1940, Serial No. 333,554

8 Claims. (Cl. 56—25.4)

This invention relates to certain new and useful improvements in a power operated sickle mower and pertains more particularly to single traction wheel mowers, and the invention having for its primary object, the provision of improved means for overcoming or balancing the drag on the sickle side of the mower.

Another object of the invention is to provide a sickle with a single traction wheel adjacent the inner ends of the sickle and with a supporting ground engaging runner which is offset at a distance from the inner end of the sickle.

A further object is to provide a sickle mower having a power source support, a sickle extending from one side of the support, a single traction wheel adjacent the inner end of the sickle, and a ground engaging runner on the other side of the support.

Another further object is to provide in a power operated sickle mower, a new and improved arrangement of parts whereby to dispose the single traction wheel intermediate the length of the mower and a counteracting ground engaging runner.

Still another object of the invention is to provide improved means in a mower for adapting the sickle to be swung below and above a horizontal plane during cutting.

Another still further object is to provide an improved supporting boxing for the sickle holder.

It is still another object of the invention to provide the power operated sickle mower with an improved arrangement of parts for increasing the operating efficiency thereof.

With the foregoing and other objects in view which will appear as the description proceeds, my invention resides in the combination and arrangement of parts and in the details of construction hereinafter described and claimed, it being understood that changes may be made within the scope of what is claimed without departing from the spirit of the invention.

An embodiment of the invention is illustrated in the accompanying drawings, wherein:

Figure 1 is a side elevation of this improved power operated sickle mower.

Figure 2 is a plan elevation of Fig. 1.

Figure 3 is a front elevation of Fig. 1, taken in the direction of the arrow 3 in Fig. 1.

Figure 4 is a rear elevation taken approximately on the line 4—4 of Fig. 1.

Figure 5 is an enlarged fragmentary sectional elevation taken approximately on the line 5—5 of Fig. 2.

Figure 6 is an enlarged horizontal sectional elevation taken approximately on the line 6—6 of Fig. 5.

Figure 7 is an enlarged vertical sectional elevation taken approximately on the line 7—7 of Fig. 2.

Referring by numerals to the accompanying drawings, 10 designates a platform having side disposed handle bars 11 each having a respective hand-grip 12, and mounted on and secured to the platform 10 is an internal combustion motor 13 having a driving shaft 14 and keyed to said shaft is a sprocket 15 over which an endless chain 16 is mounted for cooperation with a sprocket 17 of a clutch 18, said clutch being cooperably engaged with a horizontal shaft 19.

The shaft 19 is supported in end bearings 20 which are supported in the platform 10, and securely fixed to said shaft is a sprocket 21 over which an endless chain 22 is mounted for cooperation with a sprocket 23 which is disposed beneath the platform 10 and is securely fixed to a horizontal shaft 24 which is supported in the bearings of a frame 25 which is depended from the platform 10.

Securely fixed on the shaft 24 is a sprocket 26 for cooperation with a sprocket 27 which is fixed to a horizontal shaft 28, and mounted over said sprockets 26 and 27 is an endless chain 29. The shaft 28 is supported in a pair of bearings 30 which are secured to and depended from the platform 10, and loosely mounted on one end of said shaft is a supporting wheel 31 and mounted on the other end of said shaft and keyed thereto by means not shown, is a traction wheel 32.

Secured to one of the handle bars 11 adjacent the hand-grip 12 thereof is a lever 33 for operating a control wire 34 which leads to the carbureter 35 of the motor, said wire being encased in a conduit 36. The other handle bar 11 adjacent its hand-grip 12 is provided with a lever 37 and connected to the depending end of said lever is an operating rod 38 of a clutch lever 39 which is swingable on the shaft 19 and is adapted to control the clutch 18 for operating the shaft 19 by the driven sprocket 17.

Depended from the front end of the platform 10 is a frame 40 having forwardly extending arms 41 for supporting a vertically disposed tube 42 and adjustably secured to said arms is a vertically disposed leg 43 for the support of a ground engaging runner 44 at its lower end.

Secured to the leg 43 and horizontally extending therefrom adjacent its lower end, is a transverse sill 45 having an upwardly extending right angular portion 46 at its opposite end which is adjustably secured to the side member 47 of the frame 40.

Secured to or formed integral with the lower end of the member 47, is a boxing 48 for the vertically swingable support of the inner end 49 of a sickle supporting bar 50, said bar 50 being mounted on a pin 51 which is supported at its ends in respective side walls 52 of the boxing 48. The boxing 48 as more clearly shown in Figs. 5 and 6, is open at its top and the side from which the sickle supporting bar 50 is extended, and said boxing having a downwardly inclined bottom wall 53.

The sickle supporting bar 50 is of sufficient length to accommodate the sickle 54 which is horizontally supported thereby in a guiding structure 55 which comprises a plurality of sickle cooperating prongs 56 which are disposed in an alining row, said prongs being secured at their rear ends to the underside of the sickle supporting bar 50 which is disposed in alinement with the transverse sill 45 which is located forwardly of the platform 10, as shown more clearly in Fig. 2. Over-engaging the sickle 54 are a plurality of retaining fingers 57 which are secured at their rear ends on the top of the sickle supporting bar 50.

Secured to the last disposed prong 56 at the extending end of the guiding structure 55 on its underside, is a ground engaging runner 58 having an upwardly extending and rearwardly inclining guiding rod 59 at its forward end, said runner supporting the guiding structure 55 a clearance distance above the ground.

The inner end of the sickle 54 is provided with an upwardly extending bracket 60 having a horizontally extending pin 61 which is disposed in alinement with the pin 51 of the boxing 48, and turnable on said pin 61 is a bushing 62 to which a universal joint 63 is secured, and connecting said joint with another universal joint 64 is a rod 64a, the joint 64 being operably connected to a pin 65 of a crank 66 which is secured at the lower end of a vertical shaft 66a which is supported in the tube 42, the upper end of the shaft 66a having a crank 67 keyed thereto, and connected therewith is a universal joint 68 which is connected to a universal joint 69 by a connecting rod 70.

The universal joint 69 is operably connected to a pin 71 of a crank 72 which is keyed to one end of the shaft 19 which is supported in the end bearings 20 on the platform 10 which supports the motor 13.

This improved power operated sickle mower is designed primarily for use on the grounds of clubs, country homes, highways, parks and the like, and in fact, it is particularly adapted for use where hand steering manipulation is required for mowing around shrubbery and small trees.

When the mower is being moved to a place for cutting, it can be pushed forward by the handle bars, as in forward travel of the mower, both of the wheels 31 and 32 will revolve loosely on the shaft or axle 28 on which they are mounted, the ratchet mechanism not shown, providing for the loosely revolving of the wheel 32 on the shaft 28.

When the mower is in use, the guiding structure 55 of the sickle 54 is obviously horizontally inclined and the operating motor 13 will revolve the shaft 19 by the chain belt 16 transmitting rotation from the motor sprocket 15 to the driving sprocket 17 of the clutch 18. The sprocket 21 on the shaft 19 will transmit rotary motion to the intermediate shaft 24 by the chain belt 22 which encircles the sprocket 23 on said shaft 24, and the sprocket 26 on the shaft 24 will transmit motion to the wheel shaft 28 through the chain belt 29 and the sprocket 27 which is mounted on said shaft 28.

As the wheel 32 is the only one of the ground wheels which is keyed to the shaft 28, said wheel 32 will be the traction wheel for the mower whereas the wheel 31 will be but a carrying wheel. The character of keying means for the wheel 32 may be that shown in U. S. patent to Coldwell 1,039,490, for driving the wheel 32 by the shaft 28 and for allowing the wheel to revolve idly on the shaft.

Rotation of the shaft 19 will cause the crank 72 thereon to reciprocate the connecting rod 70, and as said rod is connected to the crank 67 on the upper end of the vertical shaft 66a, said shaft 66a will be oscillated and the crank 66 which is secured to the lower end of said shaft will in turn reciprocate the connecting rod 64a, said rod 64a by reason of connecting the crank 66 and the bracket 60 which is secured to one end of the sickle 54, will reciprocate the sickle in the guiding structure 55 for cutting operation of the growth over which the guiding structure 55 is traveled.

As the supporting bar 50 of the guiding structure 55 is swingably secured on the pin 51 in the boxing 48, the guiding structure and the sickle 54 carried thereby, will be self-compensating while traveling over sloping or uneven grounds, and in fact the guiding structure can assume inclining positions above and below a horizontal plane during cutting by reason of the oscillatory motions afforded by the universal joints 63 and 64 on respective ends of the connecting rod 64a.

With further regard to the adaptability of the sickle 54 to efficiently cut during reciprocation, when the guiding structure 55 is inclined either above or below a horizontal plane, the pin 61 of the bracket 60 it is to be noted, is positioned to be reciprocated at all times in the approximate plane of the pin 51 in the boxing 48 to which the supporting bar 50 is swingably connected.

This unique positioning of the pin 61 of the bracket 60 which is secured to the sickle 54, also provides for the adaptability of swinging the guiding structure 55 upwardly to an approximate vertical position shown in dotted lines in Fig. 3, to allow transporting of the mower through a narrow passage or gateway as the pin 61 will self-center in alinement with the pin 51 of the boxing 48 due to the connecting rod 64a being of a proper length. Obviously when the guiding structure 55 is disposed vertically, reciprocating motion to the sickle 54 will have ceased and for holding the guiding structure in this inactive position, a staying rod 73 is provided.

The rod 73 is swingingly depended from the front of the frame 40 and is provided with a threaded extending end and a securing nut 74 thereon, said rod when being swung to an approximate horizontal position, being engaged in an opening 75 formed in a part of the guiding structure 55 so that the nut 74 can be remounted on the threaded end of the rod 73 for securely holding the guiding structure 55 in the inactive position for transporting the mower.

The boxing 48 is an important feature for rigidly holding the supporting bar 50 of the sickle guiding structure 55 during cutting operation of the sickle 54, against the cutting thrust, and in this regard the vertically disposed walls 52 will be engaged by respective opposing edges of the bar 50, thus preventing rearward swaying of the bar.

For counteracting the side draft or thrust given to the guiding structure 55 during cutting operation of the sickle 54 thereof whereby the outer extending end of the guiding structure will tend to be swung rearward in the direction of the arc 76, shown in dotted lines in Fig. 2, whereby the traction wheel 32 would act as a fulcrum therefor, the ground runner 44 is provided, said runner being supported from the forward end of the frame 40 by the vertically adjustable leg 43 on the opposite side of the platform 10 to which the traction wheel 32 is located, said runner serving as a friction drag on the ground and thereby holding the guiding structure 55 against rearward swinging from the cutting operation thrust. Obviously the runner 44 can be adjusted to increase the carrying strain thereon of the platform 10 and the weighted mechanical equipment thereof, forwardly of the wheels 31 and 32.

In addition to the runner 44 serving as a friction drag to offset the drag or thrust on the sickle guiding structure 55, the supporting or trail wheel 31 which is loosely mounted on the shaft 28, by reason of it being on the side adjacent the runner 44, will accentuate the counteracting effect of the runner 44 in opposition to the cutting thrust given to the sickle side of the mower.

The transverse sill 45, the leg 43 from which the runner 44 is supported, and the right angular portion 46, are in a manner, part of the frame 40 which is disposed forwardly of the platform 10, and the sill 45 is purposely disposed a distance above the ground to provide a sufficient clearance for the cut-over growth and so that the cut growth can be passed over without dragging and clogging interference. Accordingly and with respect to the elevated disposition of the transverse sill 45, the horizontal connecting rod 64a is also disposed at a clearance distance above the ground as well as the boxing 48 to which the inner end of the sickle supporting bar 50 is pivotally secured, and so that the sickle 54 and its guiding structure 55 can be disposed on the required plane with the ground for proper cutting or mowing, the inner end 49 of the supporting bar 50 is provided with a right angular or downwardly bent part 77.

The angular portion 77 of the supporting bar 50 it is to be noted, is formed on the bar at the inner end 49 adjacent the pin 41 by which the bar 50 is pivotally secured to the boxing 48.

The precise location of the angular portion 77 disposes it within the boxing 48 and between the side walls 52 of the boxing so that opposing edges of the angular portion 77 will be engaged and supported by and between the walls 52 and will be reenforced thereby, so that the supporting bar 50 of the guiding structure 55 of the sickle 54 will be provided with a strong and rigid support.

Having thus described the invention so that those skilled in the art will be able to practice the same, what I desire to secure by Letters Patent is defined in what is claimed, it being understood that various changes in the apparatus shown and described in detail and not amounting to invention, may be made without departing from the spirit and scope of my invention.

What I claim is:

1. A sickle mower having a horizontally disposed reciprocable sickle, a traction wheel adjacent the inner end of said sickle, and a ground runner cooperable with said sickle and remotely disposed therefrom and in a position whereby the traction wheel is located intermediate the sickle and the runner.

2. A sickle mower having a horizontally disposed reciprocable sickle, a traction wheel adjacent the inner end of said sickle, and an adjustable ground runner disposed in a position relative to said sickle and said wheel whereby the wheel will serve as a fulcrum between said sickle and said runner.

3. A sickle mower having a supporting frame, a cutting blade horizontally extended from one side of said frame, a traction wheel on the blade side of the frame, and an adjustable ground runner extended from the frame on the other side thereof.

4. A sickle mower having a supporting frame and a horizontally disposed power driven shaft, a cutting blade extending at right angles from one side of said frame, a traction wheel keyed to said shaft on the blade side of the frame, a ground runner extended from the frame on the other side thereof, and a carrying wheel loosely mounted on said shaft.

5. A power driven sickle mower having a supporting frame, a cutting blade extending at a right angle from one side of said frame, a traction wheel on the blade side of the frame, a reciprocable rod extending across the front of the frame and connected to said blade, a vertically disposed oscillative crank shaft having its lower end connecting one end of said rod, a second rod connected to the upper end of said crank shaft and paralleling a side of said frame, and means for reciprocating said second rod.

6. A power driven sickle mower having a supporting frame, a cutting blade extending at a right angle from one side of said frame, a traction wheel on the blade side of the frame, a ground runner secured to the other side of said frame, a reciprocable rod extending across the front of the frame and connected to said blade, a vertically disposed oscillative crank shaft having its lower end connecting one end of said rod, a second rod connected to the upper end of said crank shaft and paralleling a side of said frame, and means for reciprocating said second rod.

7. A power driven sickle mower having a supporting frame, a driven shaft carried by said frame, a cutting blade extending at a right angle from one side of said frame, a traction wheel keyed to said shaft on the blade side of the frame, a ground runner secured to the other side of said frame, a carrying wheel loosely mounted on said shaft adjacent said runner, a reciprocal rod extending across the front of the frame and connected to said blade, a vertically disposed oscillative crank shaft having its lower end connecting one end of said rod, a second rod connected to the upper end of said crank shaft and paralleling a side of said frame, and means for reciprocating said second rod.

8. A sickle mower having a supporting frame, a cutting blade supported by said frame, a reciprocable rod extending across the front of the frame and connected to said blade, a vertically disposed oscillative crank shaft having its lower end connecting one end of said rod, a second rod connected to the upper end of said crank shaft and paralleling a side of said frame, and means for reciprocating said second rod.

CLAUDE C. FULTON.